United States Patent [19]

Yasuoka et al.

[11] Patent Number: 5,389,140

[45] Date of Patent: Feb. 14, 1995

[54] ELECTRODEPOSITION PAINT COMPOSITION

[75] Inventors: Yoshio Yasuoka, Fujisawa; Masafumi Kume; Hidehiko Haneishi, both of Hiratsuka, all of Japan

[73] Assignee: Kansai Paint Co., Ltd., Hyogo, Japan

[21] Appl. No.: 141,943

[22] Filed: Oct. 28, 1993

[30] Foreign Application Priority Data

Oct. 30, 1992 [JP] Japan ................................. 4-316646

[51] Int. Cl.$^6$ ............................................... C09C 1/04
[52] U.S. Cl. ...................... 106/428; 106/426; 106/442; 106/446; 106/14.39; 523/415
[58] Field of Search ............... 106/14.39, 426, 428, 106/429, 447, 442, 446; 523/415

[56] References Cited

U.S. PATENT DOCUMENTS

| | | | |
|---|---|---|---|
| 3,545,994 | 12/1970 | Lott, Jr. et al. | 106/308 |
| 3,640,743 | 2/1972 | Sheehan | 106/428 |
| 3,984,299 | 10/1976 | Jerabek | 204/181 |
| 4,017,438 | 4/1977 | Jerabek et al. | 260/29.2 EP |
| 4,904,361 | 2/1990 | Motohashi et al. | 204/181.7 |
| 5,089,542 | 2/1992 | Nishida et al. | 523/410 |
| 5,254,631 | 10/1993 | Yamamoto et al. | 525/278 |
| 5,298,148 | 3/1994 | Yasuoka et al. | 205/50 |

FOREIGN PATENT DOCUMENTS

| | | |
|---|---|---|
| 0044515 | 1/1982 | European Pat. Off. . |
| 0444710 | 9/1991 | European Pat. Off. . |
| 59-43013 | 3/1984 | Japan . |
| 2-265865 | 10/1990 | Japan . |
| 3-252476 | 11/1991 | Japan . |

OTHER PUBLICATIONS

Kansai Paints, Patent Abstracts of Japan, vol. 017 No. 327 (C-1073) 22 Jun. 1993, Abstracting JP-A-05 032 919 9 Feb. 1993.

*Primary Examiner*—Karl Group
*Attorney, Agent, or Firm*—Wenderoth, Lind & Ponack

[57] ABSTRACT

An electrodeposition paint composition which contains a titanium oxide pigment coated with 1 to 10% by weight of an zinc compound in terms of metal zinc based on the titanium oxide. It is possible by use of the composition to form a coating film excellent in corrosion resistance without using an anticorrosive pigment having a problem on measures against environmental pollution.

18 Claims, No Drawings

ELECTRODEPOSITION PAINT COMPOSITION

This invention relates to an electrodeposition paint composition capable of forming a coating film excellent, in particular, in corrosion resistance.

Since an electrodeposition paint is excellent in throwing power and can form a coating film excellent in performance such as durability and corrosion resistance, it has so far widely been used in use fields where this performance are required, for example for coating car bodies and electric appliances.

In order to further improve the corrosion resistance, an anticorrosive pigment, for example, a lead or chromium compound such as lead chromate, basic lead silicate or strontium chromate is compounded into an electrodeposition paint, but such compounds are very harmful substances and their use presents a problem in view of measures against environmental pollution. As nontoxic or low toxic anticorrosive pigments substituting for these lead compounds, etc., there have so far been tried zinc phosphate, iron phosphate, aluminum phosphate, calcium phosphate, zinc molybdate, calcium molybdate, zinc oxide, iron oxide, aluminum phosphomolybdate, zinc phosphomolybdate, etc. However, these compounds do not have an anticorrosive ability as strong as that of the above lead or chromium compounds except for the zinc compounds. Further, there is a tendency that when a large amount of a zinc containing pigment is used in the electrodeposition paint bath, the bath tends to be unstable, and particularly in a cationic electrodeposition paint, there are inconveniences, for example that zinc ions are liable to dissolve from the zinic containing pigment which is basic, and cause aggregation of a resin emulsion for cationic electrodeposition paints. Therefore, zinc pigments are not practically satisfactory.

A main object of this invention is to provide an electrodeposition paint composition wherein the above-mentioned anticorrosive pigment having a problem on measures against environmental pollution is not used and the use of a zinc containing pigment itself having a problem in stability in an electrodeposition bath is avoided, and which is stable in the bath and capable of forming a coating film having an excellent corrosion resistance equal to or higher than that of the above anticorrosive pigment or zinic containing pigment.

The present inventors have engaged in concentrated research for a means on an electrodeposition paint whereby an excellent anticorrosive ability is displayed equal to or higher than that of a lead or chromium compound and electrodeposition bath stability can be maintained. As a result they have found that by compounding a titanium oxide pigment coated with a specific amount of a zinc compound into the electrodeposition paint, an electrodeposition coating film very excellent in corrosive resistance can be obtained by use of a zinic containing pigment such as zinc white in an amount less than so far usually necessitated for exertion of an anticorrosive ability, and have completed this invention.

A titanium oxide pigment is widely used as a white pigment excellent in tinting strength and hiding power, and, usually, it is general that, as for commercial titanium oxide pigments, for improvement of the dispersibility (disintegrability) and weather resistance of the pigment particles, their surfaces are subjected to an alumina treatment or an alumina-silica treatment or the like. Further, a zinc oxide treatment is sometimes applied thereto for improvement of color fastness against light, etc., but its coating amount is under 1%. On the other hand, for example, U.S. Pat. No. 3,545,994 discloses a method for the surface treatment of a titanium oxide pigment with various metal oxides utilizing the hydrolysis of urea for enhancement of the stability of the titanium oxide pigment itself, but it is neither disclosed nor suggested therein to compound the thus treated titanium oxide pigment, as an anticorrosive pigment, into an electrodeposition paint composition.

Thus according to this invention there is provided an electrodeposition paint composition which contains a titanium oxide pigment coated with 1 to 10% by weight of an zinc compound in terms of metal zinc based on the titanium oxide.

The electrodeposition paint composition of this invention is described in more detail below.

As titanium oxide pigments in this invention, there can be used not only titanium oxide powder, but also various titanium oxide pigments which are commercially available as a white pigment and wherein a treatment for change into a pigment such as an alumina treatment or a silica-alumina treatment is appropriately applied. It is preferable that such titanium oxide pigments have an average particle size ranging generally from 0.15 to 0.35 micron, particularly from 0.20 to 0.30 micron.

Zinc compounds applied on the surface of the above titanium pigments can either be inorganic zinc compounds or organic zinc compounds. As inorganic zinc compounds there can, for example, be mentioned hydrous zinc oxide, zinc oxide, zinc hydroxide, etc., and as organic zinc compounds there can, for example, be mentioned a polymer containing a zinc (meth)acrylate unit, etc. Preferable among these are oxides of zinc, particularly hydrous zinc oxide.

The application of the above zinc compound onto the surface of a titanium oxide pigment can be carried out by mixing the titanium oxide pigment with the zinc compound according to a wet process or dry process known per se. Particularly, a process is preferable which comprises sufficiently mixing a titanium oxide pigment in a water-dispersed slurry state with a compound capable of releasing zinc ions, e.g. a water-soluble zinc compound by a wet process, and then drying and grinding the mixture. More specifically, a process is, for example, preferable which comprises dispersing a titanium oxide pigment in an aqueous medium to make a slurry; adding to the slurry a solution containing zinc ions obtained, for example, by dissolving a water-soluble zinc compound such as zinc chloride, zinc nitrate or zinc sulfate in an aqueous medium; adjusting the pH of the resultant mixture in the range of about 7 to about 9 and sufficiently mixing the mixture; depositing zinc ions as the hydroxide of zinc on the surface of the titanium oxide pigment, if necessary by carrying out a heating treatment; after filtration and washing with water, drying the mixture, e.g. at a temperature of about 100° to about 150° C., to convert zinc hydroxide deposited on the surface of the titanium oxide pigment to hydrous zinc oxide; and then grinding the product. Thereby, it is possible to obtain a titanium oxide pigment coated with hydrous zinc oxide, which is preferable in this invention.

The coating amount of the zinc compound on the titanium oxide pigment can be made to be in the range of 1 to 10% by weight, preferably 1.5 to 5% by weight, more preferably 1.5 to 2% by weight in terms of metal zinc based on the titanium oxide.

Further, when the zinc compound is deposited on the surface of the titanium oxide pigment in the above process, it is also possible to codeposit a compound of another metal such as aluminum, particularly a (hydrous) oxide of aluminum. For example, a titanium oxide pigment coated with hydrous zinc oxide and hydrous aluminum oxide in a mixed crystal state can be obtained by adding an aqueous solution of a water-soluble aluminum compound such as, for example, sodium aluminate, aluminum chloride or aluminum sulfate to a water-dispersed slurry of a titanium oxide pigment, before or after an aqueous solution of a water-soluble zinc compound is added thereto; adjusting the pH of the resultant mixture in the range of about 7 to about 9 with an acid or alkali such as sulfuric acid or sodium hydroxide; and then make the same operations as above. Such a titanium oxide pigment coated with a complex of a zinc compound and an aluminum compound is preferable from the aspect of bath stability because the dissolution of zinc into the electrodeposition paint bath is inhibited.

The coating amount of the above complex on the titanium oxide pigment can be made to be such that the hydrous zinc oxide is in the range of generally 1.3 to 12.5% by weight, preferably 2 to 5% by weight, more preferably 2 to 3% by weight as ZnO, and the hydrous aluminum oxide is in the range of 1 to 10% by weight, preferably 1.5 to 6.5% by weight, more preferably 2 to 5% by weight as $Al_2O_3$, respectively based on the titanium oxide.

The content in the electrodeposition paint composition of this invention of the thus obtained titanium oxide pigment coated with the zinc compound (including the titanium oxide pigment coated with the complex of hydrous zinc oxide and hydrous aluminum oxide) (hereafter, referred to as "zinc-coated titanium oxide pigment") cannot strictly be prescribed, but can be varied over a wide range in accordance with performance required for the electrodeposition paint, etc. It is preferable that the content is made to be in the range of usually 1 to 50 weight parts, preferably 5 to 30 weight parts, more preferably 5 to 25 weight parts per 100 weight parts of the resin solid component in the electrodeposition paint composition.

The introduction of the above zinc-coated titanium oxide pigment into the electrodeposition paint composition is not particularly limited, but can be carried out in the same manner as in the case of the compounding of a pigment into a usual electrodeposition paint composition. For example, the zinc-coated titanium oxide pigment can be treated together with a suitable dispersing resin component, other pigments, etc. in a dispersion mixer such as a ball mill to prepare a pigment paste, and the paste can then be compounded with a substrate (vehicle) resin component for paint, etc.

As other pigments usable together with the zinc-coated titanium oxide pigment, any pigments can be used so long as they are pigments usually used for electrodeposition paints, and there can, for example, be mentioned color pigments such as titanium oxide, carbon black and red iron oxide; extender pigments such as clay, mica, baryta, talc, calcium carbonate and silica; anticorrosive pigments such as aluminum phosphomolybdate and aluminum tripolyphosphate.

Further, as the above dispersing resins used for dispersing the pigments, although those mentioned later as the substrate resin for electrodeposition paints can also be used, there can be mentioned, particularly as cationic type resins, epoxy tertiary amine type resins, acrylic quaternary ammonium salt type resins, epoxy quaternary ammonium salt type resins, etc. Epoxy tertiary amine type resins are desirable from the aspect of corrosive resistance. It is preferable that as such cationic type dispersing resins, those excellent in dispersibility in water after partial neutralization are chosen, and the pH of the liquid at the time of paste preparation is made to be in the range of 6.3 to 8.5.

As preferred epoxy tertiary amine type dispersing resins excellent in dispersibility in water after partial neutralization, there can, for example, be mentioned a resin obtained by reacting (b) an amino compound having in one molecule a hydroxyl group, a secondary amino group and an amido group and (c) an amino compound having in one molecule a primary hydroxyl group and a primary or secondary amino group with (a) an epoxy resin having in one molecule at least two epoxy group-containing functional groups represented by the formula

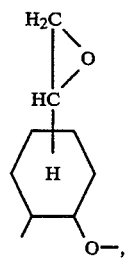

and, in some occasion, further reacting (d) a phenol compound having in one molecule at least one phenolic hydroxyl group.

As the above epoxy resin (a), there can be exemplified one disclosed in Japanese Laid-Open Patent Publication No. 265975/1990 (U.S. Pat. No. 5,089,542), for example, an epoxy resin prepared by ring opening (co)polymerizing 4-vinylcyclohexene-1-oxide alone or together with another epoxy group-containing compound through epoxy groups contained therein, using as an initiator an active hydrogen-containing organic compound such as an alcohol, a phenol, a carboxylic acid, a polyvinyl alcohol or a polyol resin to form a polyether resin, and then epoxidizing vinyl groups existing in the side chains of the resin with an oxidizing agent such as a peracid or a hydroperoxide. Further, as resins (a), commercial products are usable, too, and EHPE 3150 (trade name, produced by DAICEL CHEMICAL INDUSTRIES, LTD.) can, for example, be mentioned. This is a resin obtained by epoxidizing the vinyl groups in the ring opening polymer of 4-vinylcyclohexene-1-oxide, and its average polymerization degree is in the range of 15 to 25.

Further, as amino compounds (b) and (c) as cationizing agents, there can be mentioned those disclosed in the above publication and Japanese Laid-Open Patent Publication No. 252476/1991 (EP-A-444710), and, for example, as amino compounds (b), there can be exemplified a 1:1 adduct of an N-hydroxyalkylalkylenediamine such as hydroxyethylaminoethylamine or N-hydroxyethylpropylenediamine with monocarboxylic acid having 5 to 37 carbon atoms such as stearic acid, oleic acid or 12-hydroxystearic acid, etc., and as amino compounds (c), there can be exemplified alkanolamines such as N-methylethanolamine, N-ethylethanolamine, diethanolamine and di-n-(or iso)propanolamine.

Further as phenol compounds (d), there can, for example, be mentioned a bisphenol A type or bisphenol F type bisphenol resin having as the terminal residue a dialkanolamine, a monophenol such as nonylphenol, phenylphenol or phenol, or the like; an equimolar reaction product of a bisphenol A glycidyl ether type polyepoxide, a polyphenol of bisphenol A and an active hydrogen-containing compound such as a dialkanolamine; or the like.

It is preferable, in general, to use the above components (a) to (d) in ratios such that the amount of the secondary amino group in the amino compound (b) is in the range of 0.02 to 0.5 mole, the amount of the primary or secondary amino group in the amino compound (c) is in the range of 0.3 to 0.98 mole, and the amount of the phenolic hydroxyl group in the phenol compound (d) is in the range of 0.02 to 0.4 mole per mole of the epoxy group-containing functional group in the epoxy resin (a). Further it is preferable that the total of the above number of moles of the components (b), (c) and (d) be in the range of 0.75 to 1.5 moles per mole of the epoxy group-containing functional group in the component (a).

The electrodeposition paint compositions of the present invention may be anionic or cationic. Generally, however, cationic compositions are preferred from the standpoint of corrosion resistance. As the base resins to be contained in the compositions, any of epoxy, acrylic, polybutadiene, alkyd or polyester resins can be used, the most preferred being polyamine resins represented by amine-epoxy resin adducts.

Examples of amine-epoxy resin adducts include:

(i) adducts of polyepoxide compounds with primary mono- and poly-amines, secondary mono- and poly-amines, or mixtures of primary and secondary polyamines (cf. for example, U.S. Pat. No. 3,984,299);

(ii) adducts of polyepoxide compounds with secondary mono- and polyamines having ketiminized primary amino groups (cf. for example, U.S. Pat. No. 4,017,438); and (iii) the reaction products obtained upon etherification of polyepoxide compounds and hydroxy compounds having ketiminized primary amino groups (cf. for example, Japanese Laid-Open patent publication, Kokai No. 43013/84)

The polyepoxide compounds to be used for forming the amine-epoxy resin adducts have at least two epoxy groups per molecule. Speaking in general terms, those polyepoxide compounds having a number average molecular weight of at least 200, preferably from 400 to 4,000, more preferably from 800 to 2000, are suitable for the intended use. In particular, those formed through reaction of polyphenol compounds with epichlorohydrin are conveniently used.

Examples of the polyphenol compounds useful for forming the polyepoxide compounds include bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulphone, phenol novolac and cresol novolac.

The polyepoxide compounds may be those which have partially reacted with polyols, polyether polyols, polyester polyols, polyamideamines, polycarboxylic acids or polyisocyanate compounds, or may be those to which $\epsilon$-caprolactone, an acrylic monomer or the like has been graft-polymerized.

Said base resins may be externally crosslinking (i.e., crosslinkable under addition of a curing agent) or internally (or self) crosslinking. As the curing agents to be used with externally crosslinking resins, known crosslinking agents such as (blocked) polyisocyanate compounds and amino resins are usable, in particular, blocked polyisocyanate compounds being preferred. Also as the internally crosslinking resins, those into whose molecules blocked isocyanate groups have been introduced are conveniently used.

The blocked polyisocyanate compound, which is useful as the curing agent of said externally crosslinking resins, can be a product of an addition reaction between each approximately theoretical amount of a polyisocyanate compound and an isocyanate blocking agent. Examples of the polyisocyanate compound include aromatic, alicyclic or aliphatic polyisocyanate compounds such as tolylene diisocyanate, xylylene diisocyanate, phenylene diisocyanate, bis(isocyanatemethyl)cyclohexane, tetramethylene diisocyanate, hexamethylene diisocyanate, methylene diisocyanate and isophorone diisocyanate; and terminal isocyanate group-containing compounds which are obtained by a reaction between an excess amount of these isocyanate compounds with low molecular, active hydrogen-containing compounds such as ethylene glycol, propylene glycol, trimethylolpropane, hexanetriol, castor oil and the like.

Said isocyanate blocking agent is to block isocyanate groups in a polyisocyanate compound as added thereto. A desirable blocked isocyanate compound formed upon the addition is stable under room temperature but can regenerate free isocyanate groups by dissociating the blocked isocyanate compound when heated to about 100°–200° C. As the blocking agents which satisfy such requirements, for example, lactam compounds such as $\epsilon$-caprolactam and $\gamma$-butyrolactam; oxime compounds such as methyl ethyl ketoxime and cyclohexanoneoxime; phenolic compounds such as phenol, para-t-butylphenol and cresol; aliphatic alcohols such as n-butanol and 2-ethylhexanol; aromatic alkylalcohols such as phenylcarbinol and methylphenylcarbinol; and ether alcoholic compounds such as ethylene glycol monobutylether, etc. may be named. Of those, oxime- and lactam-type blocking agents are particularly preferred in respect of curability of electrodeposition paint compositions, because they remove at relatively low temperatures.

In the procedure for making a self-crosslinkable base resin having blocked isocyanate groups within its molecules, blocked isocyanate groups can be introduced into the base resin in conventionally practiced manner. For example, the introduction can be effected by reacting the free isocyanate groups in a partially blocked polyisocyanate compound with the active hydrogen-containing moiety of the base resin.

In order to render the base resins water-soluble or water-dispersible, cationic resins are normally neutralized with water-soluble organic acids such as formic acid, acetic acid and butyric acid. In case of anionic resins, they are neutralized with alkalies such as amines and alkali metal hydroxides, instead of above water-soluble organic acids.

If necessary, other paint additives such as organic solvents, pigment-dispersing agents, coated surface-adjusting agents and the like may be blended with the electrodeposition paint compositions of the present invention.

Furthermore, the compositions may be blended with organotin compounds as the curing catalyst, if the occasion demands. As examples of such organotin compounds, organotin oxides such as dibutyltin oxide and dioctyltin oxide, and alkyltin compounds of aliphatic or aromatic carboxylic acids such as dibutyltin dilaurate, dioctyltin dilaurate, dibutyltin diacetate, bis(dioctyl benzoyloxytin)oxide, bis(dibutyl benzoyloxytin)oxide, dioctyltin dibenzoate, dibutyltin dibenzoate and the like can be named. The amount of such an organotin compound to be blended and the blending method can follow the conventional practice.

The electrodeposition paint compositions of the present invention can be applied onto the surfaces of desired substrate by means of electrolytic deposition. In general terms the electodeposition is conducted by the steps of diluting a composition of the present invention with, for example, deionized water, to a solid content of about 5–40% by weight, adjusting the pH of the system within a range of 5.5–9.0 to form an electrodeposition bath, and conducting the electrodeposition at a bath temperature adjusted to 15°–35° C., under a load voltage of 100–400 V.

The thickness of electrodeposited coating film formable with a composition of the present invention is subject to no critical limitation. Normally, however, that of a cured coating film preferably is within a range of 10–40 $\mu$m. The adequate baking curing temperature of the coating film normally ranges from 100° to 200° C., preferably from 120° to 190° C.

It is possible, according to the above-described present invention, to provide an electrodeposition coating composition giving an electrodeposition coating film having excellent corrosion resistance almost equal or higher, compared with a case where an anticorrosive pigment such as a lead compound having a problem on measures against environmental pollution is compounded, by compounding into an electrodeposition paint composition a titanium oxide pigment whose surface was coated with a specific amount of a zinc compound, without using a usual anticorrosive pigment. Further, it is recognized that when the electrodeposition paint composition of this invention is blocked isocyanate-curable type one, the curability of the electrodeposition coating film is enhanced, and this is surmised to be because the zinc compound applied onto the surface of the titanium oxide pigment also acts as a blocked isocyanate-dissociating catalyst. When a zinc compound is thus applied on a titanium oxide pigment and used, the coated pigment can display an anticorrosive ability and a catalytic ability in an amount smaller than the use amount necessary for displaying an anticorrosive ability of a zinc containing pigment having corrosion resistance but having so far had anxiety in bath stability, and therefore never has a bad influence on the bath stability of the electrodeposition paint.

This invention is more specifically described below according to examples. Therein, "parts" and "%" mean "weight parts" and "% by weight", respectively.

PREPARATION EXAMPLE 1

180 parts of titanium oxide powder (average particle size: 0.25 micron) was uniformly dispersed at 80° C. into 2,700 parts of 4% aqueous ammonia in a 5-L four-necked flask, and 150 parts of 10% aqueous zinc chloride solution was added under stirring. The mixture was stirred, adjusted to pH 8.5, stirred at the same temperature for 1 hour, and filtered. The filter pigment cake was washed with water, dehydrated, dried at 300° C. in a dryer, and ground to obtain titanium oxide coated with hydrous zinc oxide. The amount of the hydrous zinc oxide measured by a chemical analysis is 4.0% in terms of metal zinc (5.0% as ZnO) based on the titanium oxide.

PREPARATION EXAMPLE 2

The same operations as in Preparation example 1 were made except that an aqueous zinc sulfate solution was used in an amount such that the coating amount of hydrous zinc oxide based on titanium oxide gets to be 1.5% in terms of metal zinc (1.9% as ZnO), in place of the aqueous zinc chloride solution in Preparation example 1, and thereby hydrous zinc oxide-coated titanium oxide was obtained.

PREPARATION EXAMPLE 3

Titanium oxide powder (average particle size: 0.25 micron) was uniformly dispersed into water in a 5-L four necked flask to prepare a water dispersion slurry having a solid component concentration of 25%, and the mixture was warmed to 40° C. A sodium aluminate solution was then added under stirring in an amount such that its coating amount got to be 3% as $Al_2O_3$ based on the weight of titanium oxide, and the mixture was stirred for 10 minutes. Then, a zinc sulfate solution was added in an amount such that its coating amount got to be 2.5% as ZnO based on the weight of titanium oxide, and the mixture was stirred for 10 minutes. A sodium hydroxide solution was added thereto to adjust the pH to 8.5, and the mixture was stirred at the same temperature for 30 minutes for aging and then filtered. The filter pigment cake was washed with water, dehydrated, dried at 120° C. for 15 hours and ground to obtain titanium oxide coated with the hydrous oxides of zinc and aluminum.

EXAMPLE 1

1,900 parts of Epon 1004 was dissolved in 1.012 parts of butylcellosolve, 124 parts of diethylamine was added dropwise thereto at 80° to 100° C., and then the mixture was held at 120° C. for 2 hours to obtain an epoxy resin-amine adduct having an amine value of 47.

Then, 1,000 parts of a dimeric acid type polyamide resin having an amine value of 100 (trade name "Versamide 460", produced by Henkel Hakusui Co., Ltd.) was dissolved in 429 parts methyl isobutyl ketone, the solution was refluxed with heating at 130° to 150° C., and the formed water was distilled out, and thereby the terminal amino groups of the amine resin were converted to ketimines. The resultant solution was held at 150° C. for about 3 hours, and, after the completion of the distilling out of water, cooled to 60° C. The solution was then added to the above epoxy resin-amine adduct, and mixture was heated to 100° C. and held at that temperature for 1 hour, and cooled to room temperature to obtain a varnish of an epoxy resin-amino-polyamide adduct resin having a solid content of 68% and an amine value of 65.

103 parts (70 parts as the resin solid component) of the thus obtained varnish, 30 parts (as solid component) of a 2-ethylhexylalcohol-blocked product of xylylene diisocyanate and 15 parts of 10% acetic acid were compounded, and uniformly stirred, and then 150 parts of deionized water was added dropwise thereto under vigorous stirring over a period of about 15 minutes to obtain a clear emulsion for cationic electrodeposition having a solid content of 33.6%. 69.7 parts of a pigment paste of the formulation indicated in Compounding 1 in the following Table 1 was appropriately diluted and added to the above clear emulsion under stirring, and the mixture was diluted with 271.3 parts of deionized water to obtain a cationic electrodeposition paint.

(*1) Epon 1004: A bisphenol A type epoxy resin having an epoxy equivalent of about 950, produced by Yuka Shell Epoxy Co., Ltd.

EXAMPLES 2 to 5 and COMPARATIVE EXAMPLES 1 to 5

The same operations as in Example 1 were made except that the pigment pastes of formulations indicated in Compoundings 2 to 10 in the following Table 1 were used, respectively, in place of the pigment paste of Compounding 1 in Example 1, and thereby cationic electrodeposition paints were obtained.

In this connection, as the epoxy pigment-dispersing resin (*2) used for the preparation of the pigment pastes, there was used a resin having a solid content of 80%, an amine value of 88 and a primary hydroxyl group equivalent of 28.4 obtained by subjecting to reaction at 150° C. a mixture of 900 parts of EHPE-3150 (epoxy equivalent 180, obtained by epoxidizing vinyl groups in the ring opening polymers of 4-vinylcyclohexene-1-oxide, produced by DAICEL CHEMICAL INDUSTRIES, LTD.), 210 parts of diethanolamine, 740 parts of an amino compound (the total amount of a product having an amine value of 150 obtained by dissolving with heating 570 parts of stearic acid and 208 parts of hydroxyethylaminoethylamine in 160 parts of toluene and then removing 36 parts of the reaction water and toluene with temperature rise) and 1651 parts of a phenol compound (the total amount of a product obtained by reaction at 150° C. 760 parts of bisphenol A diglycidyl ether having an epoxy equivalent of 190, 456 parts of bisphenol A, 105 parts of diethanolamine and 330 parts of ethylene glycol monobutyl ether until the residual amount of the epoxy groups got to be 0) until the residual amount of the epoxy groups got to be almost 0 (Compounding amounts in Table 1 are expressed as solid components). This resin was neutralized with acetic acid so that the pH at the time of pigment dispersion got to be 6.8, and subjected to a dispersion treatment.

Each of the electrodeposition paints obtained in Examples 1 to 5 and Comparative examples 1 to 5 was stirred for one month in a state held at 30° C., and filtered with a wire gauze of 400 meshes, and the amount of the solid remaining on the wire gauze was measured. The bath stability of each electrodeposition paint was then assessed according to the following criterion. The results are shown in Table 1.

⊙: under 5 mg/L
○: 5 mg/L or more, under 10 mg/L
△: 10 mg/L or more, under 100 mg/L
X: 100 mg/L or more

TABLE 1

| | Example | | | | |
|---|---|---|---|---|---|
| | 1 Compounding 1 | 2 Compounding 2 | 3 Compounding 3 | 4 Compounding 4 | 5 Compounding 5 |
| Electrodeposition paint | | | | | |
| Pigment paste | | | | | |
| Raw material | | | | | |
| Epoxy pigment-dispersing resin (*2) | 5 | 5 | 5 | 5 | 5 |
| Pigment of Preparation example 1 | 14 | 7 | | | |
| Pigment of Preparation example 2 | | | 14 | | |
| Pigment of Preparation example 3 | | | | 14 | 7 |
| Titanium white A (*3) | | | | | |
| Titanium white B (*4) | | 7 | | | 7 |
| Purified clay | 10 | 10 | 10 | 10 | 10 |
| Carbon black | 1 | 1 | 1 | 1 | 1 |
| Basic lead silicate | | | | | |
| Zinc molybdate | | | | | |
| Zinc oxide | | | | | |
| Dioctyltin oxide | 3 | 3 | 3 | 3 | 3 |
| Deionized water | 36.7 | 36.7 | 36.7 | 36.7 | 36.7 |
| Bath stability | ○ | ○ | ○ | ⊙ | ⊙ |

| | Comparative Example | | | | |
|---|---|---|---|---|---|
| | 1 Compounding 6 | 2 Compounding 7 | 3 Compounding 8 | 4 Compounding 9 | 5 Compounding 10 |
| Electrodeposition paint | | | | | |
| Pigment paste | | | | | |
| Raw material | | | | | |
| Epoxy pigment-dispersing resin (*2) | 5 | 5 | 5 | 5 | 5 |
| Pigment of Preparation example 1 | | | | | |
| Pigment of Preparation example 2 | | | | | |
| Pigment of Preparation example 3 | | | | | |
| Titanium white A (*3) | | | | | 14 |
| Titanium white B (*4) | 14 | 14 | 14 | 14 | |
| Purified clay | 10 | 10 | 10 | 10 | 10 |
| Carbon black | 1 | 1 | 1 | 1 | 1 |
| Basic lead silicate | | 1 | | | |
| Zinc molybdate | | | 5 | | |
| Zinc oxide | | | | 1 | |
| Dioctyltin oxide | 3 | 3 | 3 | 3 | 3 |
| Deionized water | 36.7 | 35.7 | 35.7 | 31.7 | 36.7 |

TABLE 1-continued

| Bath stability | ◉ | ○ | X | X | ◉ |

(*3) Titanium white A: produced by Teyca Co., titanium oxide "JR-701", 3% $Al_2O_3$ and <1% ZnO - coated product
(*4) Titanium white B: produced by Teyca Co., titanium oxide "JR-600E", 4% $Al_2O_8$ - coated product

COATING TEST

A cold-rolled dull finish steel plate of 0.8×150×70 mm treated with Palbond #3030 (a zinc phosphate treating agent, produced by Nippon Parkerizing Co., Ltd.) was immersed in each of the electrodeposition paints obtained in Examples 1 to 5 and Comparative examples 1 to 5. Electrodeposition was carried out with each of the paints at a voltage of 300 V, using the steel plate as a cathode. An electrodeposition coating film of approximately 20 μm in thickness (based on dry film thickness) was formed in each run, and washed with water and baked. The baking was carried out at three-levels of ambient temperatures, for a baking time of 20 minutes each, using an electric hot air current dryer. The results of performance tests of the resultant coated plates are shown in the following Table 2.

TABLE 2

| Test item | Example No. | Baking temperature 150° C. | 160° C. | 170° C. |
|---|---|---|---|---|
| Corrosion resistance (*5) | Example 1 | ○ | ◉ | ◉ |
| | Example 2 | ○ | ○ | ◉ |
| | Example 3 | ○ | ◉ | ◉ |
| | Example 4 | ○ | ◉ | ◉ |
| | Example 5 | ○ | ○ | ◉ |
| | Comparative example 1 | X | Δ | ○ |
| | Comparative example 2 | ○ | ○ | ◉ |
| | Comparative example 3 | ○ | ○ | ◉ |
| | Comparative example 4 | Δ | ○ | ◉ |
| | Comparative example 5 | X | Δ | ○ |
| Curability (*6) | Example 1 | ○ | ○ | ○ |
| | Example 2 | ○ | ○ | ○ |
| | Example 3 | ○ | ○ | ○ |
| | Example 4 | ○ | ○ | ○ |
| | Example 5 | ○ | ○ | ○ |
| | Comparative example 1 | Δ | ○ | ○ |
| | Comparative example 2 | ○ | ○ | ○ |
| | Comparative example 3 | Δ | ○ | ○ |
| | Comparative example 4 | Δ | ○ | ○ |
| | Comparative example 5 | Δ | ○ | ○ |
| Impact resistance (*7) | Example 1 | ○ | ○ | ○ |
| | Example 2 | ○ | ○ | ○ |
| | Example 3 | ○ | ○ | ○ |
| | Example 4 | ○ | ○ | ○ |
| | Example 5 | ○ | ○ | ○ |
| | Comparative example 1 | X | ○ | ○ |
| | Comparative example 2 | ○ | ○ | ○ |
| | Comparative example 3 | Δ | ○ | ○ |
| | Comparative example 4 | X | ○ | ○ |
| | Comparative example 5 | X | ○ | ○ |
| Three-coat clarity (*8) | Example 1 | ◉ | ◉ | ◉ |
| | Example 2 | ◉ | ◉ | ◉ |
| | Example 3 | ◉ | ◉ | ◉ |
| | Example 4 | ◉ | ◉ | ◉ |
| | Example 5 | ◉ | ◉ | ◉ |
| | Comparative example 1 | X | ○ | ◉ |
| | Comparative example 2 | ○ | ◉ | ◉ |
| | Comparative example 3 | Δ | ○ | ◉ |
| | Comparative example 4 | Δ | ○ | ◉ |
| | Comparative example 5 | X | ○ | ◉ |

The performance tests were conducted by the following methods.

(*5) Corrosion resistance
The electrodeposited coating was cross-cut with a knife penetrating to the substrate, and subjected to a salt spray test for 1,000 hours in accordance with JIS Z2371. The evaluation was made based on the widths of the rust and blister which developed from the cut with the knife, in four-level grading system as follows.
◉: The maximum width of rust or blister is less than 1 mm (one side) as measured from the cut portion.
○: The maximum width of rust or blister is 1 mm or more but less than 2 mm (one side) as measured from the cut portion.
Δ: The maximum width of rust or blister is 2 mm or more but less than 3 mm (one side) as measured from the cut portion, and blisters are conspicuous on the flat portion.
X: The maximum width of rust or blister is 3 mm or more as measured from the cut portion, and blisters are developed on the whole area of the coated surface.

(*6) Curability:
The surface of each of the electrodeposition coated plates was rubbed with four sheets of gauze cloth overlayed on one another and impregnated with methyl isobutyl ketone, at a pressure of about 4 kg/cm² over a length of about 3-4 cm, 20 reciprocal times. Then the appearance of the coated surface was visually evaluated in three levels as follows.
○: No flaw is observed on the coated surface.
Δ: A little flaw is observed on the coated surface but the substrate is still invisible.
X: The coated surface is dissolved and the substrate is visible.

(*7) Impact resistance
The test was conducted using a Du Pont's Impact Tester under the following conditions: the diameter of the impact center, ½ inch; dropping distance of the weight, 50 cm; and the measuring atmosphere, 20° C. The portion dented under the impact was graded by visual observation as follows.
○: No abnormality.
Δ: A few, fine cracks are observed.
X: Large cracks are observed.

(*8) Three-Coat Clarity
Onto a surface of each of the electrodeposition coated plates, Amilac TP-37 Gray (an aminoalkyd intermediate coating paint manufactured by Kansai Paint Co., Ltd.) was applied by means of spray coating to a dry coating film thickness of about 35 μm, followed by 20 minutes' baking at 140° C. Further onto the same surface Amilac TM13 White (an aminoalkyd top coating paint manufactured by Kansai Paint Co., Ltd.) was applied by spray coating to a dry coating film thickness of about 35 μm, followed by 20 minutes' baking at 140° C. The clarity of so 3-coated surfaces was evaluated using an Image Clarity Meter manufactured by Suga Tester K.K.
◉: Measured value of 80 or higher
○: Measured value of 75 to less than 80
Δ: Measured value of 70 to less than 75
X: Measured value of less than 70

The performance tests were conducted by the following methods.

(*5) Corrosion resistance
The electrodeposited coating was cross-cut with a knife penetrating to the substrate, and subjected to a salt spray test for 1,000 hours in accordance with JIS Z2371. The evaluation was made based on the widths of the rust and blister which developed from the cut with the knife, in four-level grading system as follows.
◉: The maximum width of rust or blister is less than 1 mm (one side) as measured from the cut portion.
○: The maximum width of rust or blister is 1 mm or more but less than 2 mm (one side) as measured from the cut portion.
: The maximum width of rust or blister is 2 mm or more but less than 3 mm (one side) as measured from the cut portion, and blisters are conspicuous on the flat portion.
x: The maximum width of rust or blister is 3 mm or more as measured from the cut portion, and blisters are developed on the whole area of the coated surface.

(*6) Curability:

The surface of each of the electrodeposition coated plates was rubbed with four sheets of gauze cloth overlayed on one another and impregnated with methyl isobutyl ketone, at a pressure of about 4 kg/cm² over a length of about 3-4 cm, 20 reciprocal times. Then the appearance of the coated surface was visually evaluated in three levels as follows.

◯: No flaw is observed on the coated surface.
: A little flaw is observed on the coated surface but the substrate is still invisible.
x: The coated surface is dissolved and the substrate is visible.

(*7) Impact resistance

The test was conducted using a Du Pont's Impact Tester under the following conditions: the diameter of the impact center, ½ inch; dropping distance of the weight, 50 cm; and the measuring atmosphere, 20° C. The portion dented under the impact was graded by visual observation as follows.

◯: No abnormality.
: A few, fine cracks are observed.
x: Large cracks are observed.

(*8) Three-Coat Clarity

Onto a surface of each of the electrodeposition coated plates, Amilac TP-37 Gray (an aminoalkyd intermediate coating paint manufactured by Kansai Paint Co., Ltd.) was applied by means of spray coating to a dry coating film thickness of about 35 μm, followed by 20 minutes' baking at 140° C. Further onto the same surface Amilac TM13 White (an aminoalkyd top coating paint manufactured by Kansai Paint Co., Ltd.) was applied by spray coating to a dry coating film thickness of about 35 μm, followed by 20 minutes' baking at 140° C. The clarity of so 3-coated surfaces was evaluated using an Image Clarity Meter manufactured by Suga Tester K.K.

⊙: Measured value of 80 or higher
◯: Measured value of 75 to less than 80
: Measured value of 70 to less than 75
x: Measured value of less than 70

What is claimed is:

1. A cationic electrodeposition paint composition which contains a titanium oxide pigment having a coating consisting essentially of a complex of hydrous zinc oxide and hydrous aluminum oxide, wherein the coating amount of the complex based on the titanium oxide is such that the hydrous zinc oxide is 1.3 to 12.5% by weight as ZnO and the hydrous aluminum oxide is 1 to 10% by weight as Al₂O₃.

2. A composition defined in claim 1 wherein the coating amount of the complex based on the titanium oxide is such that the hydrous zinc oxide is 2 to 5% by weight as ZnO and the hydrous aluminum oxide is 1.5 to 6.5% by weight as Al₂O₃.

3. A composition defined in claim 1 which contains the coated titanium oxide pigment in an amount ranging from 1 to 50 weight parts per 100 weight parts of the resin solid component of the composition.

4. A composition defined in claim 1 which contains the coated titanium oxide pigment in an amount ranging from 5 to 30 weight parts per 100 weight parts of the resin solid component of the composition.

5. A composition defined in claim 1, which comprises a polyamine resin as the base resin.

6. A composition defined in claim 5, in which the polyamine resin is an amine-epoxy resin adduct.

7. A composition defined in claim 1, which comprises an externally crosslinking base resin and a blocked polyisocyanate compound as a curing agent.

8. A composition defined in claim 1, which comprises a self-crosslinkable base resin containing within its molecules blocked isocyanate groups.

9. A composition defined in claim 7 or 8, which further comprises an organotin compound as a curing catalyst.

10. A composition defined in claim 1 comprising a polyamine resin, a blocked polyisocyanate compound, and a titanium oxide pigment coated with a complex of hydrous zinc oxide and hydrous aluminum oxide, the coating amount of said complex based on the titanium oxide being such that the hydrous zinc oxide is 1.3 to 12.5% by weight as ZnO and the hydrous aluminum oxide is 1 to 10% by weight as Al₂O₃.

11. A composition defined in claim 1 comprising a self-crosslinkable polyamine resin containing blocked isocyanate groups in the molecule, and a titanium oxide pigment coated with a complex of hydrous zinc oxide and hydrous aluminum oxide, the coating amount of said complex based on the titanium oxide being such that the hydrous zinc oxide is 1.3 to 12.5% by weight as ZnO and the hydrous aluminum oxide is 1 to 10% by weight as Al₂O₃.

12. An electrodeposition bath containing the composition defined in claim 1.

13. An electrodeposition coating method which comprises conducting electrodeposition coating of substrate surfaces using the composition defined in claim 1.

14. An electrodeposition coating method for the coating of a substrate surface, which comprises diluting a composition defined in claim 1 with deionized water to a solid content of 5-40% by weight, adjusting the pH of the system within a range of 5.5-9.0 to form an electrodeposition bath, and conducting electrodeposition at a bath temperature adjusted to 15°-35° C., under a load voltage of 100-400 V.

15. A coated article on which the composition defined in claim 1 is electrolytically deposited.

16. A composition defined in claim 1 wherein the titanium oxide pigment is treated with a dispersing resin to prepare a pigment paste to be compounded with a substrate resin for paint, and the pH of the liquid at the time of paste preparation is made to be in the range of 6.3 to 8.5.

17. A composition defined in claim 16 wherein the dispersing resin is a resin obtained by reacting (b) an amino compound having in one molecule a hydroxyl group, a secondary amino group and an amido group and (c) an amino compound having in one molecule a primary hydroxyl group and a primary or secondary amino group with (a) an epoxy resin having in one molecule at least two epoxy group-containing functional groups represented by the formula

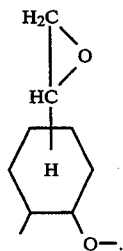

18. A composition as defined in claim 17 wherein the obtained resin is further reacted with (d) a phenol compound having in one molecule at least one phenolic hydroxyl group.

* * * * *